United States Patent
Lee (10) Patent No.: US 7,707,435 B2
(45) Date of Patent: Apr. 27, 2010

(54) METHOD AND SYSTEM FOR SAFE AND EFFICIENT CHIP POWER DOWN DRAWING MINIMAL CURRENT WHEN A DEVICE IS NOT ENABLED

(75) Inventor: Jonathan F. Lee, Dublin, CA (US)

(73) Assignee: Broadcom Corporation, Irvine, CA (US)

( * ) Notice: Subject to any disclaimer, the term of this patent is extended or adjusted under 35 U.S.C. 154(b) by 600 days.

(21) Appl. No.: 11/269,419

(22) Filed: Nov. 8, 2005

(65) Prior Publication Data

US 2006/0288245 A1  Dec. 21, 2006

Related U.S. Application Data (60) Provisional application No. 60/691,023, filed on Jun. 16, 2005.

(51) Int. Cl.
  *G06F 1/00* (2006.01)
  *G06F 1/26* (2006.01)
  *G06F 1/32* (2006.01)
  *G05F 3/02* (2006.01)

(52) U.S. Cl. .............. 713/300; 713/320; 713/323; 323/304

(58) Field of Classification Search .......... 713/300, 713/320, 323; 323/304
See application file for complete search history.

(56) References Cited

U.S. PATENT DOCUMENTS

| | | | | |
|---|---|---|---|---|
| 4,659,947 A | * | 4/1987 | Ogura et al. | 326/42 |
| 5,091,659 A | * | 2/1992 | Michail et al. | 326/18 |
| 5,274,323 A | * | 12/1993 | Dobkin et al. | 323/280 |
| 5,627,412 A | | 5/1997 | Beard | |
| 6,366,957 B1 | * | 4/2002 | Na | 709/229 |
| 6,636,025 B1 | * | 10/2003 | Irissou | 323/313 |
| 6,658,518 B2 | * | 12/2003 | Domon | 710/305 |
| 6,791,157 B1 | * | 9/2004 | Casto et al. | 257/529 |
| 6,952,784 B1 | * | 10/2005 | Miller | 713/300 |
| 6,954,864 B2 | * | 10/2005 | Schelling | 713/310 |
| 7,073,077 B1 | * | 7/2006 | Gavlik | 713/300 |
| 7,142,009 B1 | * | 11/2006 | Watt et al. | 326/38 |
| 2002/0104031 A1 | * | 8/2002 | Tomlinson et al. | 713/320 |

(Continued)

OTHER PUBLICATIONS

Intersil, ISL6556B Data Sheet, Dec. 28, 2004, retrieved online from http://www.intersil.com/data/fn/fn9097.pdf on Jul. 6, 2009.*

*Primary Examiner*—Ji H Bae
(74) *Attorney, Agent, or Firm*—McAndrews, Held & Malloy, Ltd.

(57) ABSTRACT

Certain embodiments of a method and system for safe and efficient power down and drawing minimal current when a device is not enabled may comprise receiving within a network adapter chip (NAC) a signal that indicates a reduced power mode. Based on this signal, the NAC may control an off-chip voltage source that provides reduced voltage to circuitry within the NAC. The off-chip voltage source, which may comprise a first PNP transistor and a second PNP transistor, may reduce a voltage to a first voltage and a second voltage. The NAC may also reduce current through the off-chip voltage source to approximately zero amperes and an output voltage of the off-chip voltage source to approximately zero volts. The first voltage and/or the second voltage may be fed back to control the output voltage and current of the off-chip voltage source.

29 Claims, 6 Drawing Sheets

U.S. PATENT DOCUMENTS

| | | | |
|---|---|---|---|
| 2002/0120882 A1* | 8/2002 | Sarangi et al. | 713/600 |
| 2003/0126486 A1* | 7/2003 | Bui | 713/320 |
| 2003/0198196 A1* | 10/2003 | Bahl et al. | 370/311 |
| 2004/0028156 A1* | 2/2004 | Sefidvash et al. | 375/346 |
| 2005/0060587 A1* | 3/2005 | Hwang et al. | 713/300 |
| 2005/0063348 A1* | 3/2005 | Donovan | 370/338 |
| 2005/0188232 A1* | 8/2005 | Weng et al. | 713/320 |
| 2006/0036877 A1* | 2/2006 | Anderson et al. | 713/300 |
| 2007/0076747 A1* | 4/2007 | Zinaty | 370/463 |

* cited by examiner

METHOD AND SYSTEM FOR SAFE AND EFFICIENT CHIP POWER DOWN DRAWING MINIMAL CURRENT WHEN A DEVICE IS NOT ENABLED

CROSS-REFERENCE TO RELATED APPLICATIONS/INCORPORATION BY REFERENCE

This application makes reference to, claims priority to, and claims benefit of U.S. Provisional Application Ser. No. 60/691,023 filed Jun. 16, 2005.

This application also makes reference to:

U.S. patent application Ser. No. 11/269/064 filed Nov. 8, 2005; and

U.S. patent application Ser. No. 11,269,414 filed Nov. 8, 2005.

Each of the above stated applications is hereby incorporated herein by reference in its entirety.

FIELD OF THE INVENTION

Certain embodiments of the invention relate to integrated circuits or chips. More specifically, certain embodiments of the invention relate to a method and system for safe and efficient chip power down drawing minimal current when a device is not enabled.

BACKGROUND OF THE INVENTION

It is desirable to be able to completely power down a device when it is not in use or when it is disabled. For example, a notebook computer may have a wired LAN adapter and a wireless LAN adapter installed. When the notebook computer is moved from one location to another, the wireless LAN adapter may be used, for example, when there is no wired LAN available. As a result, the wired LAN adapter may not be needed. Accordingly, the wired LAN adapter may be disabled to reduce power consumption, which conserves battery power.

Some conventional systems may configure the wired LAN adapter to operate in a power down state by disabling clock signals, turning off transceivers, and/or configuring analog devices to operate in a standby state. However, there may still be some current drawn from a power supply. For example, a network adapter device (NAC) may have three primary supply voltages: 1.2V, 2.5V, and 3.3V. When the NAC is configured to operate in the power down state by asserting, for example, a LOW_POWER_MODE pin, the lowest measured current may be, for example, about 27 mA. This may translate to over 100 mW of power consumption during the power down state when the current is regulated down from the 5V supply in the system.

The NAC may derive the other supply voltages of 2.5V and 1.2V from the 3.3V supply voltage. In order to avoid this power drain from the 2.5V and 1.2V supply voltages, as well as from the 3.3V supply voltage, some conventional systems may turn off the 3.3V supply to the NAC. A disadvantage with this approach may be that turning off the 3.3V supply voltage to the NAC may affect long-term reliability of the NAC because it may stress damage the I/O cells in the NAC. This may also lead to leakage current through the non-powered I/O cells to which the NAC may be coupled. The resulting power drain at the system level may be greater than if the 3.3V supply voltage to the NAC was not turned off.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for safe and efficient chip power down drawing minimal current when a device is not enabled, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for safe and efficient chip power down drawing minimal current when a device is not enabled. Aspects of the method may comprise receiving within a network adapter chip a signal that indicates a reduced power mode. Based on the signal indicating the reduced power mode, the network adapter chip may control an off-chip voltage source that provides reduced voltage to circuitry within the network adapter chip. The off-chip voltage source may comprise at least a first transistor and a second transistor configured to supply various voltages to the network adapter chip.

The first transistor, which may be a PNP transistor, may reduce a voltage at an emitter of the first transistor to a first voltage at a collector of the first transistor. The first voltage may be supplied to circuitry that requires the first voltage. Similarly, the second transistor, which may be a PNP transistor, may reduce a voltage at an emitter of the second transistor to a second voltage at a collector of the second transistor. The second voltage may be supplied to circuitry that requires the second voltage.

A current through the off-chip voltage source may be reduced to approximately zero amperes based on the signal indicating the reduced power mode. The voltage at the output of the off-chip voltage source, for example, the first voltage and/or the second voltage, may be reduced to approximately zero volts based on the signal indicating the reduced power mode. The reduced voltage, for example, the first voltage and/or the second voltage, may be fed back for controlling the off-chip voltage source, for example, the first transistor and/or the second transistor, from within the network adapter chip.

Figure 1:
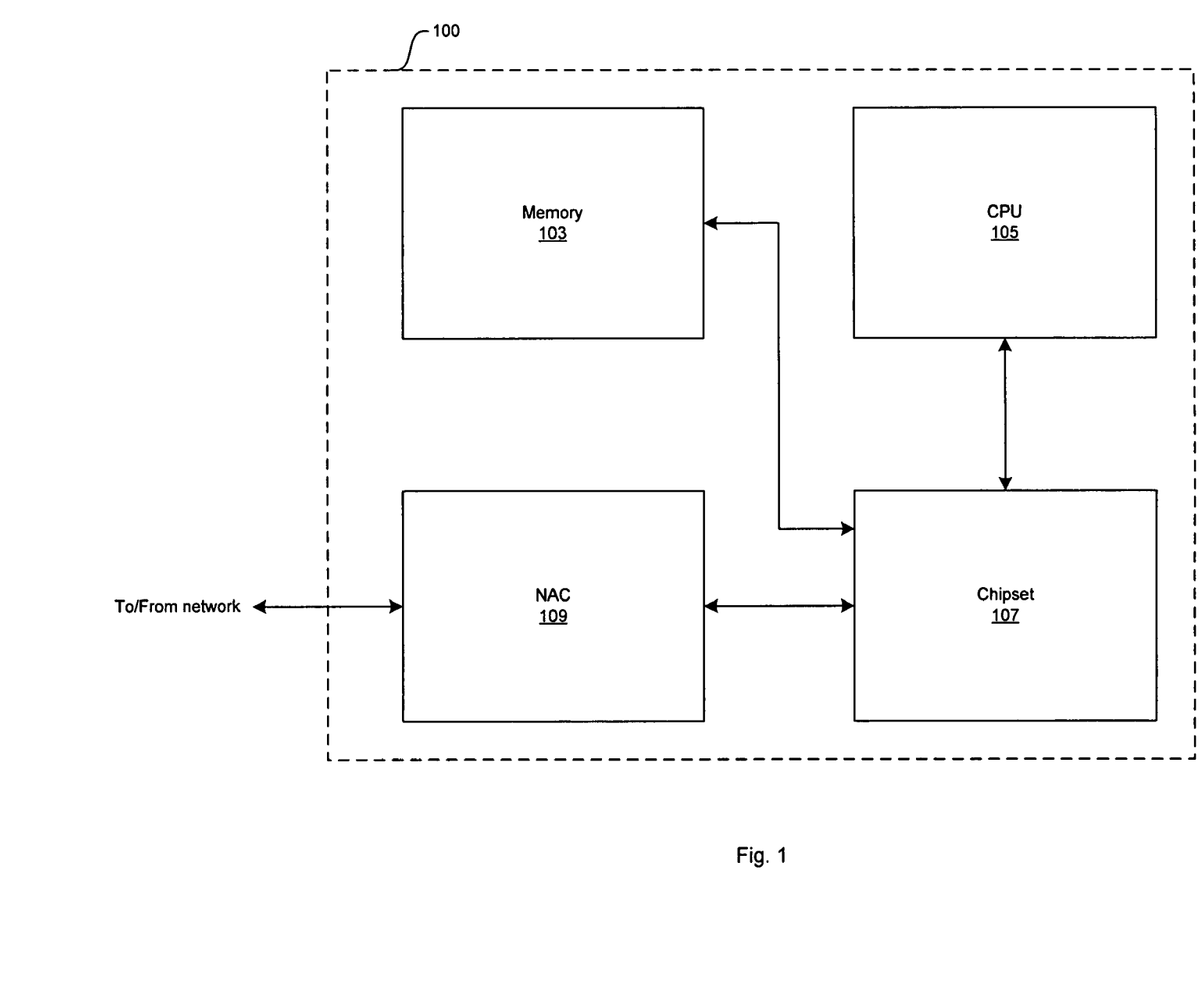
FIG. 1 is a block diagram illustrating an exemplary network adapter card, which may be utilized in connection with an embodiment of the invention.

FIG. 1 is a block diagram illustrating an exemplary network adapter card, which may be utilized in connection with an embodiment of the invention. Referring to FIG. 1, there is shown a laptop 100 with a few of the internal components, for example, a memory block 103, a CPU 105, a chipset 107, and a network adapter chip (NAC) 109. The CPU 105 may communicate with the memory block 103 and the chipset 107, and the chipset 107 may communicate with the NAC 109. The NAC 109 may be physically connected to a network, such as, for example, an Ethernet network, via a cable. In this manner, the NAC 109 may transmit data to the network and receive data from the network.

The memory block 103 may comprise suitable logic, circuitry, and/or code that may be adapted to store a plurality of control, status and/or data information. The information stored in memory block 103 may be accessed by other processing blocks, for example, the CPU 105.

The CPU 105 may comprise suitable logic, circuitry, and/or code that may be adapted to process data that may be read from, for example, the memory block 103. The CPU may store data in the memory block 103, and/or communicate data, status, and/or commands with other devices in the laptop, for example, the chipset 107 and/or the NAC 109.

The chipset 107 may comprise suitable logic, circuitry, and/or code that may be adapted to manage input/output data such as voice and/or data traffic from the CPU to the memory block 103 and/or peripheral devices, for example, the NAC 109.

The NAC 109 may comprise suitable logic, circuitry, and/or code that may be adapted to physically interface to the network, for example, the Ethernet network, via a cable. Accordingly, the laptop 100 may send and receive data to and from the Ethernet network.

In operation, the CPU 105 may communicate data to the NAC 109 for transmission to a network destination. Data may be received from a network source, for example, an external computer that may also be on the network, and the NAC 109 may indicate to the CPU 105 the availability of the received data. The CPU 105 may then process the data and/or save the data in the memory block 103.

Figure 2A:
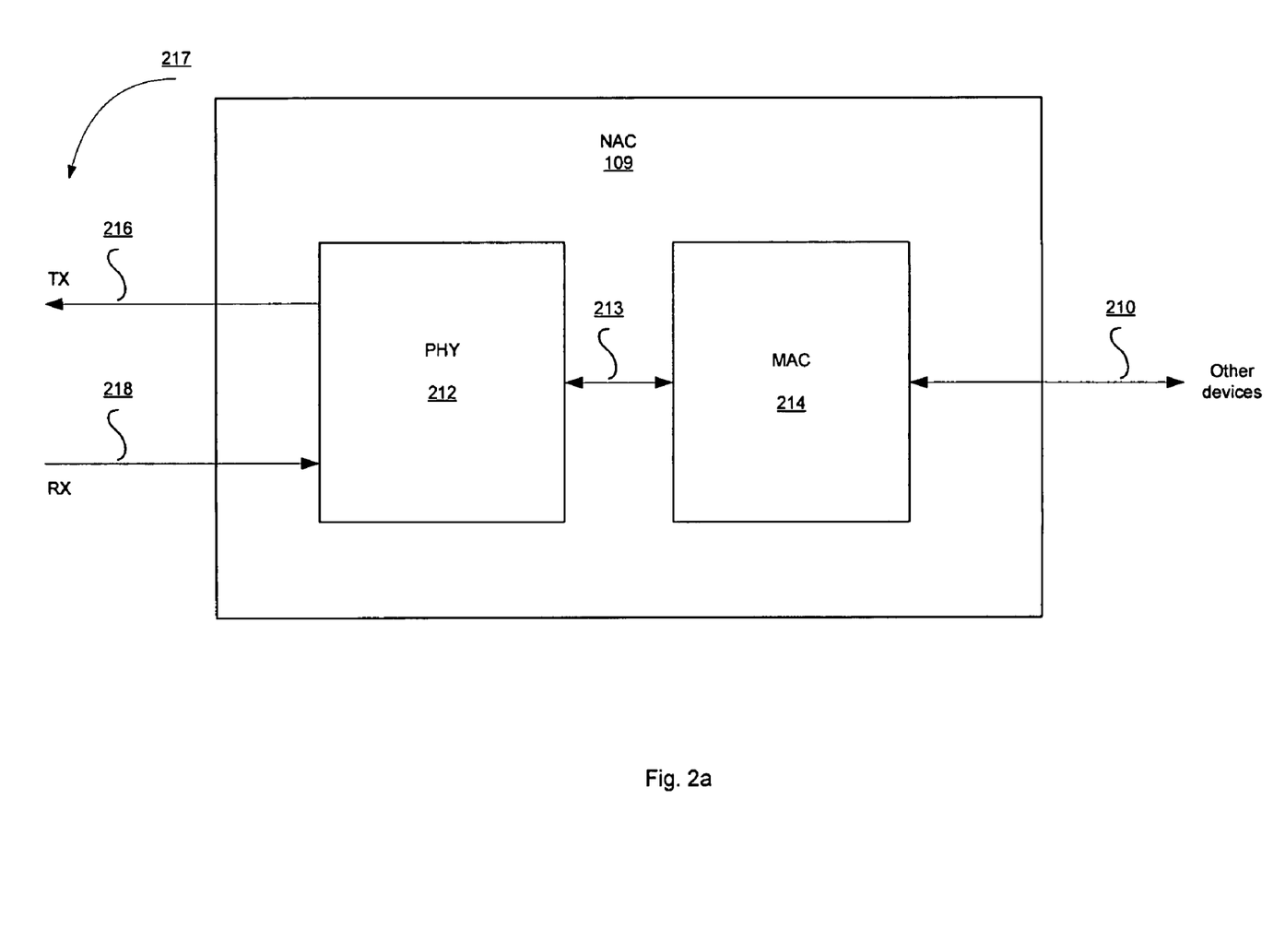
FIG. 2a is a block diagram illustrating an exemplary physical layer device and media access controller, which may be utilized in connection with an embodiment of the invention.

FIG. 2a is a block diagram illustrating an exemplary physical layer device and media access controller, which may be utilized in connection with an embodiment of the invention. Referring to FIG. 2a, there is shown the NAC 109 that may comprise a physical network interface layer (PHY) 212 and a media access controller (MAC) 214.

The PHY 212 may comprise suitable logic, circuitry, and/or code that may be adapted to interface to a network, for example, an Ethernet network. For example, the PHY 212 may be fully compatible with at least IEEE 802.3 standard for auto-negotiation of data transfer speed, where the IEEE 802.3 may be the IEEE standard for Ethernet.

The MAC 214 may comprise suitable logic, circuitry, and/or code that may be adapted to properly format data for packet transmission on, for example, the Ethernet network. The MAC 214 may also be adapted to receive data from the Ethernet network and to remove the Ethernet network related frame information so that higher level protocols may extract desired information from the received frame.

In operation, the PHY 212 may communicate data with the network via a transmit and receive interface 217. The transmit and receive interface 217 may comprise a serial transmit interface 216 and a serial receive interface 218. The PHY 212 may receive Ethernet network data via the serial receive interface 218, and transmit data to the Ethernet network via the serial transmit interface 216. The PHY 212 may sense collision when transmitting data and may comply with the Carrier Sense Multiple Access/Collision Detect (CSMA/CD) access method defined in IEEE 802.3

The MAC 214 may receive data from, for example, the CPU 105 (FIG. 1), and form appropriate frames for the Ethernet network, for example. The MAC 214 may communicate the frames to the PHY 212 via the interface 213 between the PHY 212 and the MAC 214. Additionally, the MAC 214 may receive data from the Ethernet network via the PHY 212. The MAC 214 may remove the network related information, for example, the Ethernet protocol information, and may communicate the remaining data to, for example, the CPU 105 via, for example, a general purpose I/O (GPIO) interface 210. The CPU 105 may process the received frame to retrieve data that may have been sent by another application on the network. The GPIO bus 210 may be a general bus interface defining various pins, which may be configurable, for input and/or output usage, an interface that uses the GPIO standard, or a PCI or PCI-X interface. The particular definition of pin-outs for bus signals may be design and/or implementation dependent.

Figure 2B:
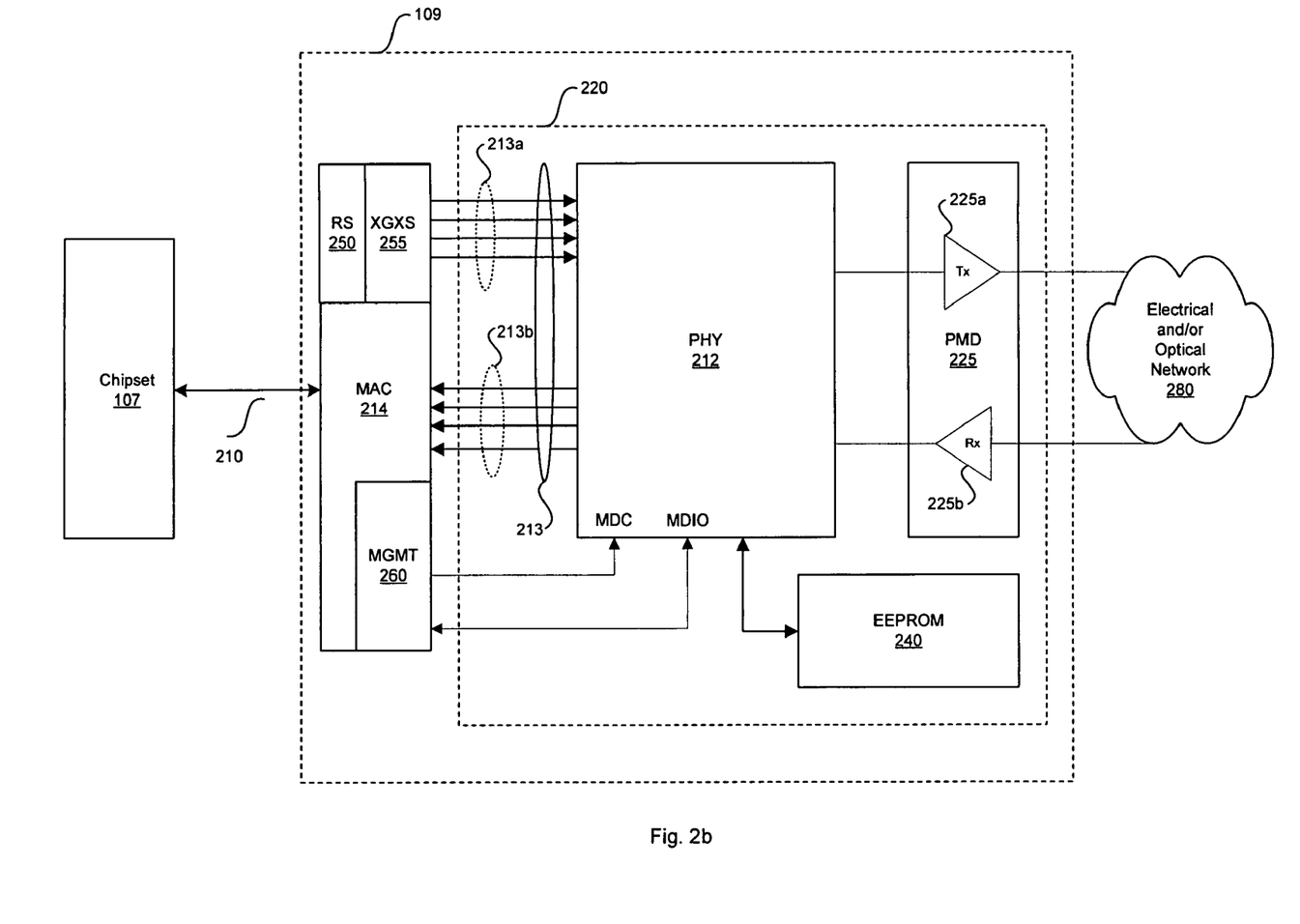
FIG. 2b is a block diagram of an exemplary Ethernet transceiver module and a media access controller, in accordance with an embodiment of the invention.

FIG. 2b is a block diagram of an exemplary Ethernet transceiver module and a media access controller, in accordance with an embodiment of the invention. Referring to FIG. 2b, there is illustrated the chipset 107, the network adapter chip (NAC) 109, and a network 280. The NAC 109 may comprise the MAC 214 and a transceiver module 220. The transceiver module 220 may comprise the PHY 212, an electrically erasable programmable read only memory (EEPROM) 240, and a physical medium dependent (PMD) transceiver 225. The PMD transceiver 225 may comprise a PMD transmitter 225a and a PMD receiver 225b. The chipset 107 may interface with the MAC 214 through the GPIO bus 210 and may communicate with the network 280 through the transceiver module 220. The network 280 may be an electrical and/or optical network. The PMD transmitter 225a and a PMD receiver 225b may not be needed in cases when the network 280 is an electrical network.

Transceiver module 220 may be configured to communicate data between the chipset 107 and the network 280. The data transmitted and/or received may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, a layer 1 may provide services to a layer 2 and the layer 2 may provide services to a layer 3. A data link layer, the layer 2, may include a MAC layer whose functionality may be handled by the MAC 214. In this regard, the MAC 214 may be configured to implement the well-known IEEE 802.3 Ethernet protocol.

In an embodiment of the invention, the MAC 214 may represent the layer 2 and the transceiver module 220 may represent the layer 1. The layer 3 and above may be represented by a CPU, for example, the CPU 105 (FIG. 1), which may be accessed from the NAC 109 via the chipset 107. The CPU 105 may be configured to build five highest functional layers for data packets that are to be transmitted over the network 280. Since each layer in the OSI model may provide a service to the immediately higher interfacing layer, the MAC 214 may provide the necessary services to the CPU 105 to ensure that packets are suitably formatted and communicated to the transceiver module 220. During transmission, each layer may add its own header to the data passed on from the interfacing layer above it. However, during reception, a compatible device having a similar OSI stack may strip off the headers as the message passes from the lower layers up to the higher layers.

The transceiver module 220 may be configured to handle all the physical layer requirements, which may include, but is not limited to, packetization, data transfer and serialization/deserialization (SerDes). The transceiver module 220 may operate at a plurality of data rates, which may include 10 Mbps, 100 Mbps and 1 Gbps, for example. Data packets received by the transceiver module 220 from the MAC 214 may include data and header information for each of the above six functional layers. The transceiver module 220 may be configured to encode data packets that are to be transmitted over the network 280. The transceiver module 220 may also be configured to decode data packets received from the network 280.

The MAC 214 may interface with the PHY 212 through, for example, the interface 213. The interface 213 may be a low pin count, self-clocked bus. The interface 213 may act as an extender interface for a media independent interface (XMGII). In this regard, MAC 214 may also include a reconciliation sublayer (RS) interface 250 and an XGMII extender sublayer (XGXS) interface 255. The MAC 214 may also include an integrated link management (MGMT) interface 260 that may facilitate communication between the MAC 214 and a management data input/output (MDIO) interface of the PHY 212.

The PMD transceiver 225 may include at least one PMD transmitter 225a and at least one PMD receiver 225b. In operation, PMD transceiver 225 may be configured to receive data from and transmit data to the network 280. The PMD transmitter 225a may transmit data originating from the CPU 105. The PMD receiver 225b may receive data destined for the CPU 105 from the network 280 and transmit the data to the CPU 105 via the chipset 107. The PMD 225 may also be configured to function as an electro-optical interface. In this regard, electrical signals may be received by PMD transmitter 225a and transmitted in a format such as optical signals over the network 280. Additionally, optical signals may be received by PMD receiver 225b and transmitted as electrical signals to the chipset 107.

The transceiver module 220 may also include an EEPROM 240. The PHY 212 may be coupled to the EEPROM 240 through an interface such as a serial interface or bus. The EEPROM 240 may be programmed with information such as, for example, parameters and/or code that may effectuate the operation of the PHY 212. The parameters may include configuration data and the code may include operational code such as software and/or firmware, but the information is not limited in this regard.

Figure 3:
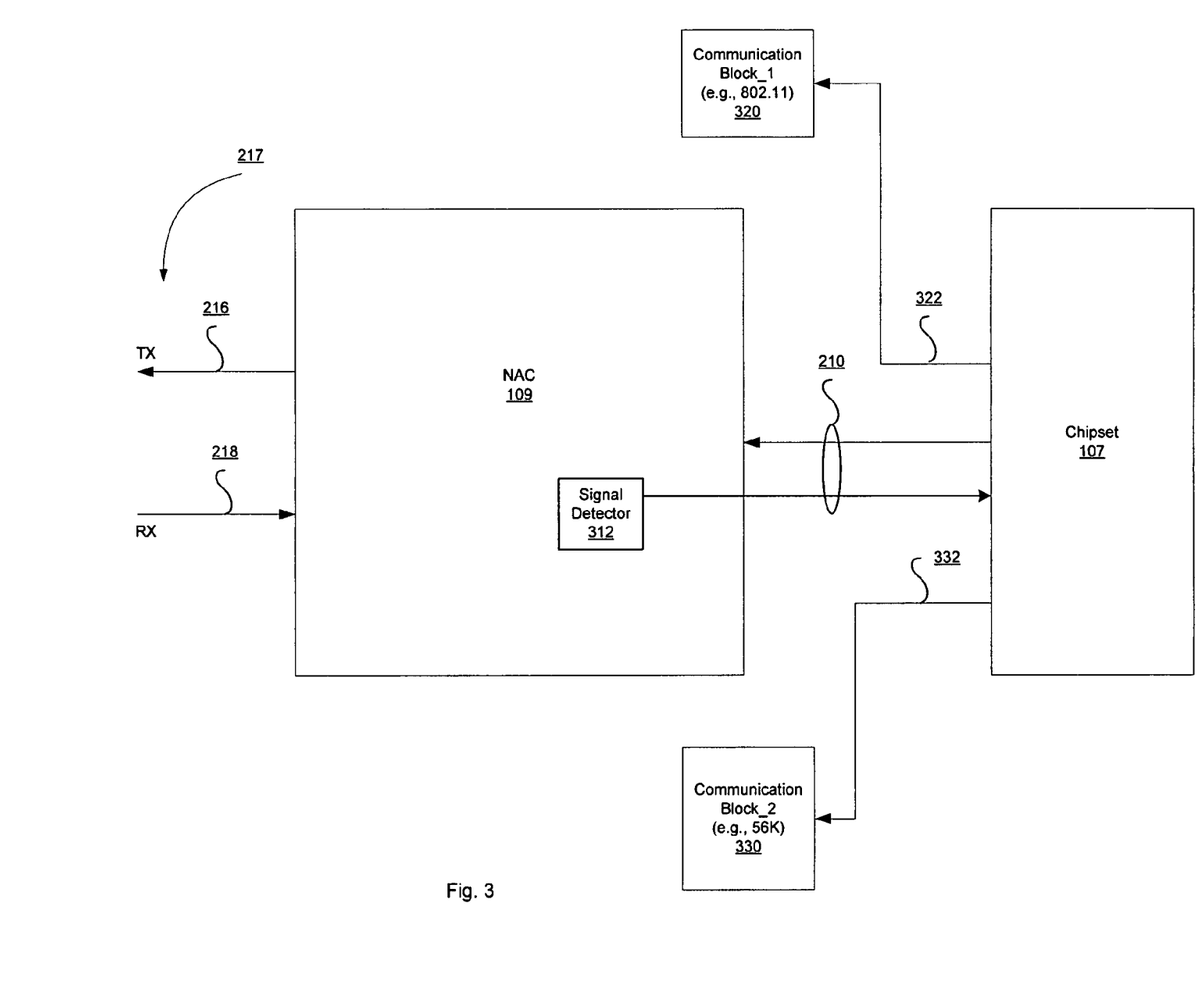
FIG. 3 is a block diagram illustrating an exemplary communication from a chipset to a physical layer device for power save mode, which may be utilized in connection with an embodiment of the invention.

FIG. 3 is a block diagram illustrating exemplary communication from a chipset to a physical layer device for power save mode, which may be utilized in connection with an embodiment of the invention. Referring to FIG. 3, there is shown the chipset 107, the NAC 109, a communication block_1 320, and a communication block_2 330. The NAC 109 may comprise a signal detector 312.

The communication block_1 320 and the communication block_2 330 may comprise logic, circuitry, and/or code that may be adapted to allow the laptop 100 (FIG. 1) to communicate with external devices. For example, the communication block_1 320 may be a wireless network interface adhering to the IEEE 802.11g standard for wireless networks, and the communication block_2 330 may be a 56 Kbps modem.

The signal detector 312 may comprise circuitry, logic and/or code that may be adapted to detect network activity, for example, Ethernet signals, that may be communicated to the signal detector 312 via the serial receive interface 218. If network activity is detected, the signal detector 312 may, for example, assert a network activity detected signal Energy_Detect. If the signal detector 312 does not detect network activity, it may de-assert, for example, the network activity detected signal Energy_Detect.

In operation, the signal detector 312 may detect when no network data is being received via the serial receive interface 218. This may be due to the laptop 100 using the communication block_1 320 or the communication block_2 330 for wireless network access or modem access, respectively. Accordingly, the signal detector 312 may communicate the lack of wired network data to the CPU 105 (FIG. 1) via the chipset 107. The CPU 105 may communicate a signal to the NAC 109, via the chipset 107, which may indicate when the NAC 109 may enter a reduced power state.

The NAC 109 may supply power to the signal detector 312 even in the reduced power state. This may be so that the signal detector 312 may be able to detect when network data is being received via the serial receive interface 218. When network data is detected, the signal detector 312 may communicate the detection to the CPU 105 via the chipset 107. The CPU 105 may communicate a signal to the NAC 109, via the chipset 107, which may indicate that the NAC 109 may power up in order to allow the laptop 100 to connect to the wired LAN.

The NAC 109 may support a plurality of power states that may be dependent on a user set power configuration and/or system power considerations. For example, entering the reduced power state may depend on whether the laptop 100 is powered by AC power or by DC power from a battery. If AC power is being used by the laptop 100, the laptop 100 may not be required to enter into a reduced power state since there may be no perceived need to save power. The laptop 100 may also enter a reduced power state after a certain amount of time has elapsed. The elapsed time may be a default value, for example, 10 minutes, and/or may be settable by the laptop 100 user.

However, if DC power is being used, an embodiment of the invention may power down the NAC 109 when it is determined that no network data is detected. Generally, one of a plurality of methods may be used to power down the NAC 109. For example, one method may comprise disabling clock signals, turning off transceivers, and/or putting analog devices into a standby state. Another method may comprise reducing a supply voltage to the NAC 109 that may be used as a supply voltage by the NAC 109, and from which it may generate other supply voltages. In an exemplary embodiment of the invention, the NAC 109 may receive a 3.3V supply voltage and generate a 2.5V supply voltage and 1.2V supply voltage from the 3.3V supply voltage. This may be accomplished with a voltage divider circuit that may use passive devices and/or active devices such as transistors. Accordingly, when the NAC 109 is to be powered down, the 3.3V supply voltage may be reduced to substantially zero volts.

In various embodiments of the invention, the NAC 109 may generate the required lower voltage supply voltages, for example, 2.5V and 1.2V supply voltages, from, for example, the 3.3V supply voltage. This may be described in more detail with respect to FIG. 4. However, if the NAC 109 is powered down, the 3.3V supply voltage may still be supplied to the NAC 109, but the NAC 109 may reduce the 2.5V and 1.2V supply voltages to substantially zero volts. Additionally, the currents to the circuitry that may require the 2.5V and 1.2V supply voltages may be reduced to substantially zero amperes. This may be further described with respect to FIG. 4.

Figure 4:
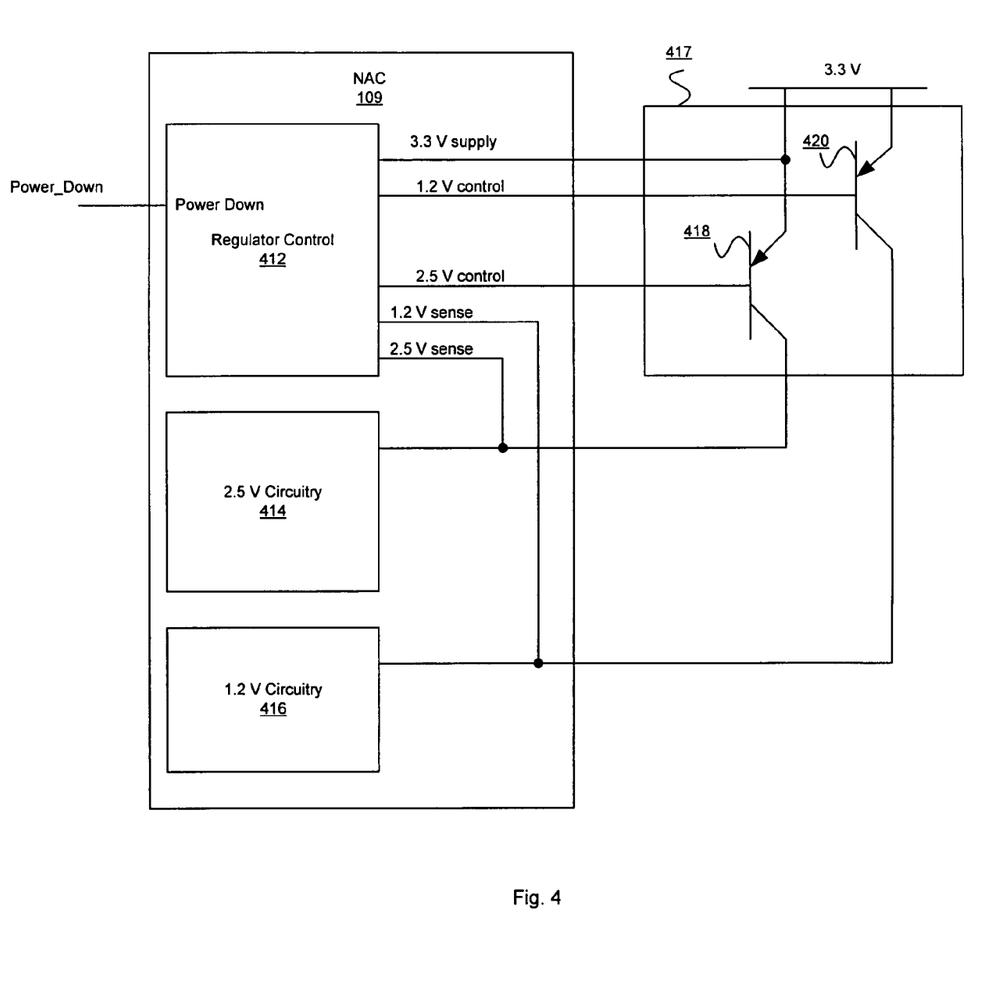
FIG. 4 is a block diagram illustrating an exemplary off-chip voltage source, in accordance with an embodiment of the invention.

FIG. 4 is a block diagram illustrating an exemplary off-chip voltage source, in accordance with an embodiment of the invention. Referring to FIG. 4, there is shown the NAC 109, and a voltage source 417 that may comprise PNP transistors 418 and 420. The NAC 109 may comprise a regulator control block 412, 2.5V circuitry 414, and 1.2V circuitry 416.

The regulator control block 412 may use 3.3V supply voltage as its supply voltage and may generate a 2.5V control signal and a 1.2V control signal that may be communicated to bases of the PNP transistors 418 and 420, respectively. The 3.3V supply voltage may be coupled to an emitter of each of the PNP transistors 418 and 420. Collectors of the PNP transistors 418 and 420 may have as outputs the 2.5V and 1.2V supply voltages, respectively. The 2.5V supply voltage may be communicated to the 2.5V circuitry 414 on the NAC 109, which may require the 2.5V supply voltage. Similarly, the 1.2V supply voltage may be communicated to the 1.2V circuitry 416 on the NAC 109, which may require the 1.2V supply voltage. Accordingly, the PNP transistors 418 and 420 may be part of an off-chip voltage source 417, where the NAC 109 may not comprise the PNP transistors 418 and 420.

The 2.5V control signal may indicate to the transistor 418 to reduce the 3.3V supply voltage to 2.5 volts or to reduce the voltage to zero volts. Similarly, the 1.2V control signal may control the transistor 420 so as to reduce the 3.3V supply voltage to 1.2 volts or to reduce the voltage to zero volts. Additionally, the 2.5V and 1.2V supply voltages may also be fed back to the regulator control block 412 to assist in regulating the 2.5V and 1.2V supply voltages, respectively. Accordingly, the 2.5V and 1.2V supply voltages to the 2.5V circuitry 414 and the 1.2V circuitry 416, respectively, may be communicated to the regulator control block 412.

A Power_Down signal, which may be communicated from the chipset 107, for example, via the GPIO interface 210, may cause the NAC 109 to power down. Assertion of the Power_Down signal to indicate power down of the NAC 109 may be via a dedicated pin Power Down on the regulator control block 412. As a result, very little, if any, current may be conducted to the 1.2V circuitry 416 and the 2.5V circuitry 414. The regulator block 412 may consume a little current from the 3.3V supply voltage for the circuitry that may control the PNP transistors 418 and 420. Additionally, since there is no input or output signals from the NAC 109, except for the Power_Down signal, there may be very little power, if at all, from the 3.3V supply voltage used for the input or output of signals.

The system may re-enable the NAC 109 by deasserting the Power_Down pin. This may occur, for example, if a laptop 100 user enables operation of the NAC 109 by allowing connection to a network, for example, an Ethernet network. In response, the regulator control block 412 may generate appropriate voltage levels for the 1.2V control signal and the 2.5V control signal communicated to the base of the PNP transistors 420 and 418, respectively. Accordingly, the voltage and current from the PNP transistors 418 and 420 may be turned on and off as needed.

Figure 5:
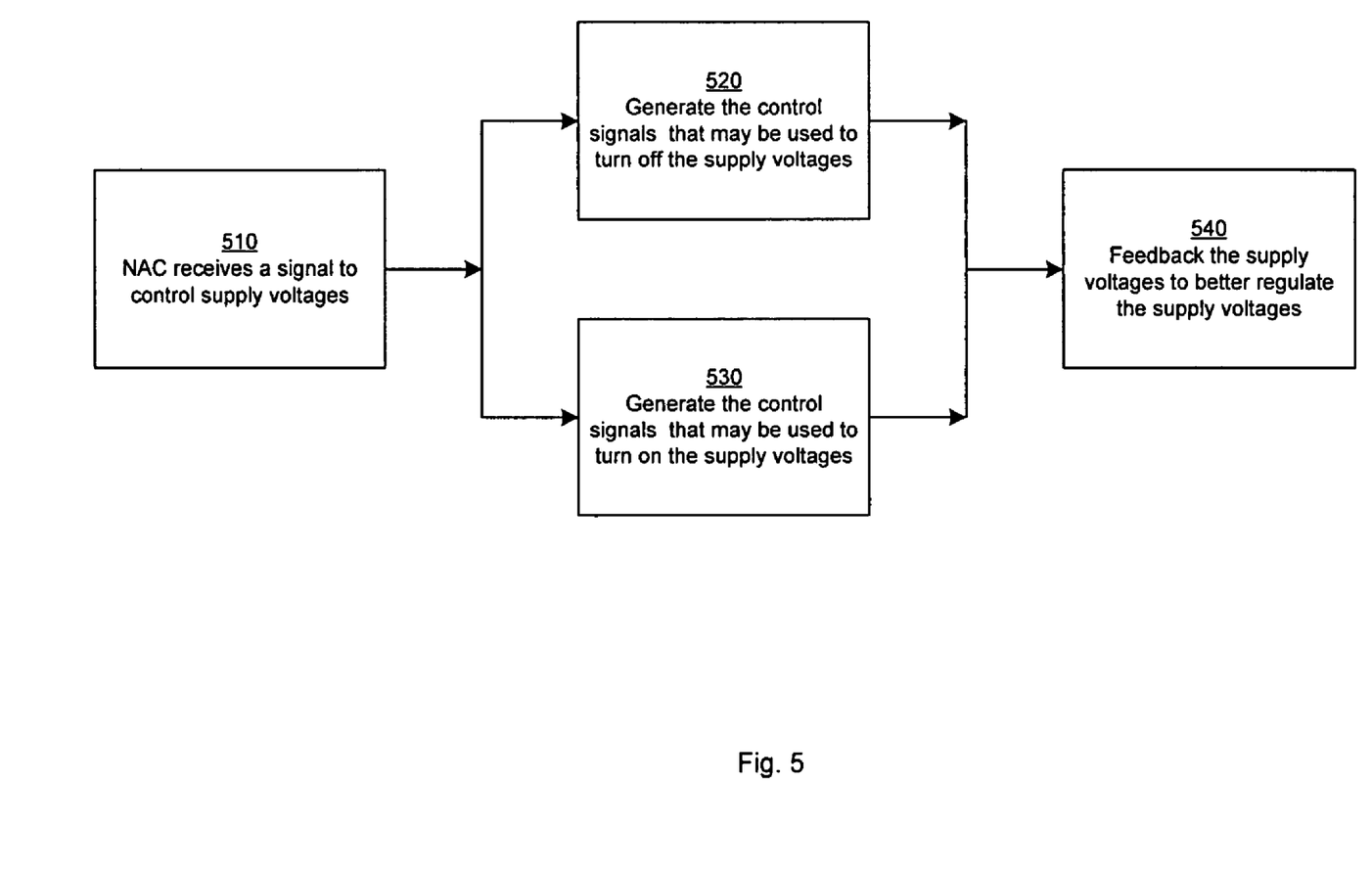
FIG. 5 is a flow diagram illustrating an exemplary routine for power saving mode, in accordance with an embodiment of the invention.

FIG. 5 is a flow diagram illustrating an exemplary routine for power saving mode, in accordance with an embodiment of the invention. Referring to FIG. 5, and with respect to FIG. 4, there is shown a plurality of steps 510 to 540 that may be utilized to power down and power up a chip, for example, the NAC 109. In step 510, a signal, for example, the signal Power_Down (FIG. 4), may be received by the regulator control block 412. An asserted state of the signal Power_Down may indicate that the 1.2V and 2.5V supply voltages may need to be turned off to the 1.2V circuitry 416 and the 2.5V circuitry 414, respectively. A de-asserted state of the signal Power_Down may indicate that the 1.2V and 2.5V supply voltages may need to be turned on to the 1.2V circuitry 416 and the 2.5V circuitry 414, respectively.

In step 520, the received signal Power_Down may indicate that the 1.2V control signal and the 2.5V control signal may be adjusted to turn off the voltage source 417. Accordingly, the 1.2V and 2.5V supply voltages may be reduced to substantially zero volts, and substantially zero amperes of current may flow through the PNP transistors 418 and 420. Accordingly, the 1.2V circuitry 416 and the 2.5V circuitry 414 may be in a powered-down state.

In step 530, the received signal Power_Down may indicate that the 1.2V control signal and the 2.5V control signal may be adjusted to turn on the voltage source 417. Accordingly, the 1.2V and 2.5V control signals may turn on the PNP transistors 418 and 420, and the voltages at the collectors of the PNP transistors 418 and 420 may be substantially 2.5 volts and 1.2 volts, respectively. Accordingly, the 1.2V circuitry 416 and the 2.5V circuitry 414 may be in a powered-on state.

In step 540, the 1.2V and 2.5V supply voltages communicated to the 1.2V circuitry 416 and the 2.5V circuitry 414, respectively, may be fed back to the regulator control block. The 1.2V and 2.5V supply voltages may be used to control the 1.2V and 2.5V control signals, respectively, in order to keep the outputs of the PNP transistors 418 and 420 at the desired voltage level. For example, substantially zero volts when the PNP transistors 418 and 420 are turned off, or substantially 2.5 volts and 1.2 volts when the PNP transistors 418 and 420, respectively, are turned on.

Although embodiments of the invention may have been described where the voltage source 417 may be PNP transistors, for example, the PNP transistors 418 and 420, the invention need not be so limited. For example, the voltage source 417 may comprise NPN transistors, and/or MOS transistors, and/or circuits using active and/or passive parts.

The network adapter chip (NAC) 109 (FIG. 4) may receive a signal, for example, the Power_Down signal, which may indicate a reduced power mode. Based on the signal indicating the reduced power mode, the NAC 109 may control the voltage source 417 (FIG. 4) that may be off-chip, which may provide reduced voltage to circuitry within the NAC 109. The off-chip voltage source, which may be the voltage source 417, may comprise at least a first transistor, which may be the transistor 418 (FIG. 4), and a second transistor, which may be the transistor 420 (FIG. 4), that may be configured to supply various voltages to the NAC 109.

The transistor 418, which may be a PNP transistor, may reduce a voltage at an emitter of the transistor 418 to a first voltage at a collector of the transistor 418. The first voltage may be supplied to circuitry that requires the first voltage, for example, the 2.5V circuitry 414 (FIG. 4). Similarly, the transistor 420, which may be a PNP transistor, may reduce a voltage at an emitter of the transistor 420 to a second voltage at a collector of the transistor 420. The second voltage may be supplied to circuitry that requires the second voltage, for example, the 1.2V circuitry 416 (FIG. 4).

A current through the voltage source 417 may be reduced to approximately zero amperes based on a signal, for example, the Power_Down signal (FIG. 4), indicating the reduced power mode. The voltage at the output of the off-chip voltage source 417, for example, the first voltage and/or the second voltage, may be reduced to approximately zero volts based on the signal, for example, the Power_Down signal, indicating the reduced power mode. The reduced voltage, for example, the first voltage and/or the second voltage, may be fed back for controlling the voltage source 417, for example, the transistor 418 and/or the transistor 420, from within the NAC 109.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for regulating power, the method comprising:
   receiving within a network adapter chip, from a device external to said network adapter chip, a signal indicating a reduced power mode of said network adapter chip; and
   controlling from within said network adapter chip, an off-chip voltage source that provides reduced voltage to circuitry within said network adapter chip based on said signal indicating said reduced power mode, wherein said reduced voltage is sensed within said network adapter chip for said controlling of said off-chip voltage source.

2. The method according to claim 1, wherein said off-chip voltage source comprises at least a first transistor and a second transistor.

3. The method according to claim 2, wherein said first transistor is a PNP transistor.

4. The method according to claim 3, comprising said PNP transistor supplying a first voltage.

5. The method according to claim 4, comprising communicating a voltage to be reduced to said first voltage to an emitter of said PNP transistor, communicating a control signal from within said network adapter chip to a base of said PNP transistor for said controlling, and communicating said first voltage from a collector of said PNP transistor to circuitry that requires said first voltage.

6. The method according to claim 2, wherein said second transistor is a PNP transistor.

7. The method according to claim 6, comprising said PNP transistor supplying a second voltage.

8. The method according to claim 7, comprising communicating a voltage to be reduced to said second voltage to an emitter of said PNP transistor, communicating a control signal from within said network adapter chip to a base of said PNP transistor for said controlling, and communicating said second voltage from a collector of said PNP transistor to circuitry that requires said second voltage.

9. The method according to claim 1, comprising reducing a current through said off-chip voltage source to approximately zero amperes based on said signal indicating said reduced power mode.

10. The method according to claim 1, comprising reducing a voltage at said output of said off-chip voltage source to approximately zero volts based on said signal indicating said reduced power mode.

11. The method according to claim 10, comprising feeding back said reduced voltage for said controlling from within said network adapter chip said off-chip voltage source.

12. A system for regulating power, the system comprising:
    circuitry within a network adapter chip that is operable to receive, from a device external to said network adapter chip, a signal indicating a reduced power mode of said network adapter chip; and
    circuitry within said network adapter chip that is operable to control an off-chip voltage source that provides reduced voltage to circuitry within said network adapter chip based on said signal indicating said reduced power mode, wherein said reduced voltage is sensed within said network adapter chip for said control of said off-chip voltage source.

13. The system according to claim 12, wherein said off-chip voltage source comprises at least a first transistor and a second transistor.

14. The system according to claim 13, wherein said first transistor is a PNP transistor.

15. The system according to claim 14, wherein said PNP transistor is operable to supply a first voltage.

16. The system according to claim 13, wherein said second transistor is a PNP transistor.

17. The system according to claim 16, wherein said PNP transistor is operable to supply a second voltage.

18. The system according to claim 12, wherein a current through said off-chip voltage source is reduced to approximately zero amperes based on said signal indicating said reduced power mode.

19. The system according to claim 12, wherein a voltage at said output of said off-chip voltage source is reduced to approximately zero volts based on said signal indicating said reduced power mode.

20. The system according to claim 19, wherein said reduced voltage is fed back for said controlling from within said network adapter chip said off-chip voltage source.

21. The system according to claim 12, comprising a controller within said network adapter chip coupled to a first transistor and to a second transistor.

22. The system according to claim 21, wherein a voltage to be reduced is coupled to an emitter of said first transistor, to an emitter of said second transistor, and to said controller.

23. The system according to claim 21, wherein a base of said first transistor and a base of said second transistor are coupled to said network adapter chip.

24. The system according to claim 21, wherein a collector of said first transistor is coupled to circuitry within said network adapter chip that requires a first voltage, and a collector of said second transistor is coupled to circuitry within said network adapter chip that requires a second voltage.

25. The system according to claim 21, wherein a collector of said first transistor and a collector of said second transistor are coupled to said network adapter chip.

26. A method for regulating power, the method comprising:
receiving within a network adapter chip, from a device external to said network adapter chip, a signal indicating a reduced power mode of said network adapter chip;
controlling from within said network adapter chip, an off-chip voltage source that provides reduced voltage to circuitry within said network adapter chip based on said signal indicating said reduced power mode, wherein said off-chip voltage source comprises a first transistor and a second transistor, said first transistor being a PNP transistor supplying a first voltage;
communicating a voltage to be reduced to said first voltage to an emitter of said PNP transistor;
communicating a control signal from within said network adapter chip to a base of said PNP transistor for said controlling; and
communicating said first voltage from a collector of said PNP transistor to circuitry that requires said first voltage.

27. A method for regulating power, the method comprising:
receiving within a network adapter chip, from a device external to said network adapter chip, a signal indicating a reduced power mode of said network adapter chip;
controlling from within said network adapter chip, an off-chip voltage source that provides reduced voltage to circuitry within said network adapter chip based on said signal indicating said reduced power mode, wherein said off-chip voltage source comprises a first transistor and a second transistor, said second transistor being a PNP transistor supplying a second voltage;
communicating a voltage to be reduced to said second voltage to an emitter of said PNP transistor;
communicating a control signal from within said network adapter chip to a base of said PNP transistor for said controlling; and
communicating said second voltage from a collector of said PNP transistor to circuitry that requires said second voltage.

28. A system for regulating power, the system comprising:
circuitry within a network adapter chip that is operable to receive, from a device external to said network adapter chip, a signal indicating a reduced power mode of said network adapter chip; and
circuitry within said network adapter chip that is operable to control an off-chip voltage source that provides reduced voltage to circuitry within said network adapter chip based on said signal indicating said reduced power mode, wherein a controller within said network adapter chip is coupled to a first transistor and to a second transistor, and wherein a voltage to be reduced is coupled to said controller, to an emitter of said first transistor, and to an emitter of said second transistor.

29. A system for regulating power, the system comprising:
circuitry within a network adapter chip that is operable to receive, from a device external to said network adapter chip, a signal indicating a reduced power mode of said network adapter chip; and
circuitry within said network adapter chip that is operable to control an off-chip voltage source that provides reduced voltage to circuitry within said network adapter chip based on said signal indicating said reduced power mode, wherein a controller within said network adapter chip is coupled to a first transistor and to a second transistor, and wherein a collector of said first transistor is coupled to circuitry that requires a first voltage, and a collector of said second transistor is coupled to circuitry that requires a second voltage.

* * * * *